(12) United States Patent
Komoda

(10) Patent No.: US 7,663,993 B2
(45) Date of Patent: Feb. 16, 2010

(54) DISK DEVICE FOR RECORDING AND REPRODUCING DISKS WITH ADAPTIVE ROTATION CONTROL

(75) Inventor: Osamu Komoda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 11/220,590

(22) Filed: Sep. 8, 2005

(65) Prior Publication Data

US 2006/0077815 A1   Apr. 13, 2006

(30) Foreign Application Priority Data

Sep. 13, 2004   (JP) ............... 2004-264800

(51) Int. Cl.
*G11B 7/00* (2006.01)
(52) U.S. Cl. .............. 369/47.41; 369/53.22; 369/47.46; 369/47.1
(58) Field of Classification Search .............. 369/47.41, 369/47.46
See application file for complete search history.

(56) References Cited

U.S. PATENT DOCUMENTS

| 5,914,928 | A   | 6/1999 | Takahshi |           |
|-----------|-----|--------|----------|-----------|
| 6,028,828 | A   | 2/2000 | Maeda    |           |
| 6,118,745 | A * | 9/2000 | Hutchins et al. | 369/59.19 |
| 6,292,625 | B1  | 9/2001 | Gotoh et al. |       |
| 6,367,038 | B1* | 4/2002 | Ko       | 714/710   |
| 6,678,235 | B1* | 1/2004 | Watanabe | 369/275.3 |
| 6,870,802 | B1* | 3/2005 | Kimura et al. | 369/47.41 |
| 2002/0051412 | A1* | 5/2002 | Kawashima et al. | 369/47.39 |
| 2004/0165498 | A1* | 8/2004 | Masaaki et al. | 369/47.39 |
| 2005/0147399 | A1  | 7/2005 | Kimura et al. |       |

FOREIGN PATENT DOCUMENTS

| JP | 02-101678      | 4/1990  |
| JP | 8-22676        | 1/1996  |
| JP | 08-124180      | 5/1996  |
| JP | A-HEI09-259537 | 10/1997 |
| JP | 10-124879      | 5/1998  |
| JP | 2001-312860    | 11/2001 |
| JP | 2001-351334    | 12/2001 |
| JP | 2004-134022    | 4/2004  |
| WO | WO 98/14938    | 4/1998  |
| WO | WO 00/74052    | 12/2000 |

\* cited by examiner

*Primary Examiner*—Wayne R Young
*Assistant Examiner*—Adam R Giesy
(74) *Attorney, Agent, or Firm*—Antonelli, Terry, Stout & Kraus, LLP.

(57) ABSTRACT

A disk device is arranged to select an appropriate rotation control method according to a kind of an optical disk, a recording format or a recording method so that a recording operation for a certain amount of information may be completed as fast as possible, even if a waiting time takes place until the rotation is set. The disk device includes a unit for selecting the rotation control method for recording a certain amount of information more efficiently and rapidly in light of time according to a kind of an optical disk, a recording format or a recording method. The selected rotation control method is executed to control the rotation of the optical disk when recording information on the disk.

8 Claims, 3 Drawing Sheets

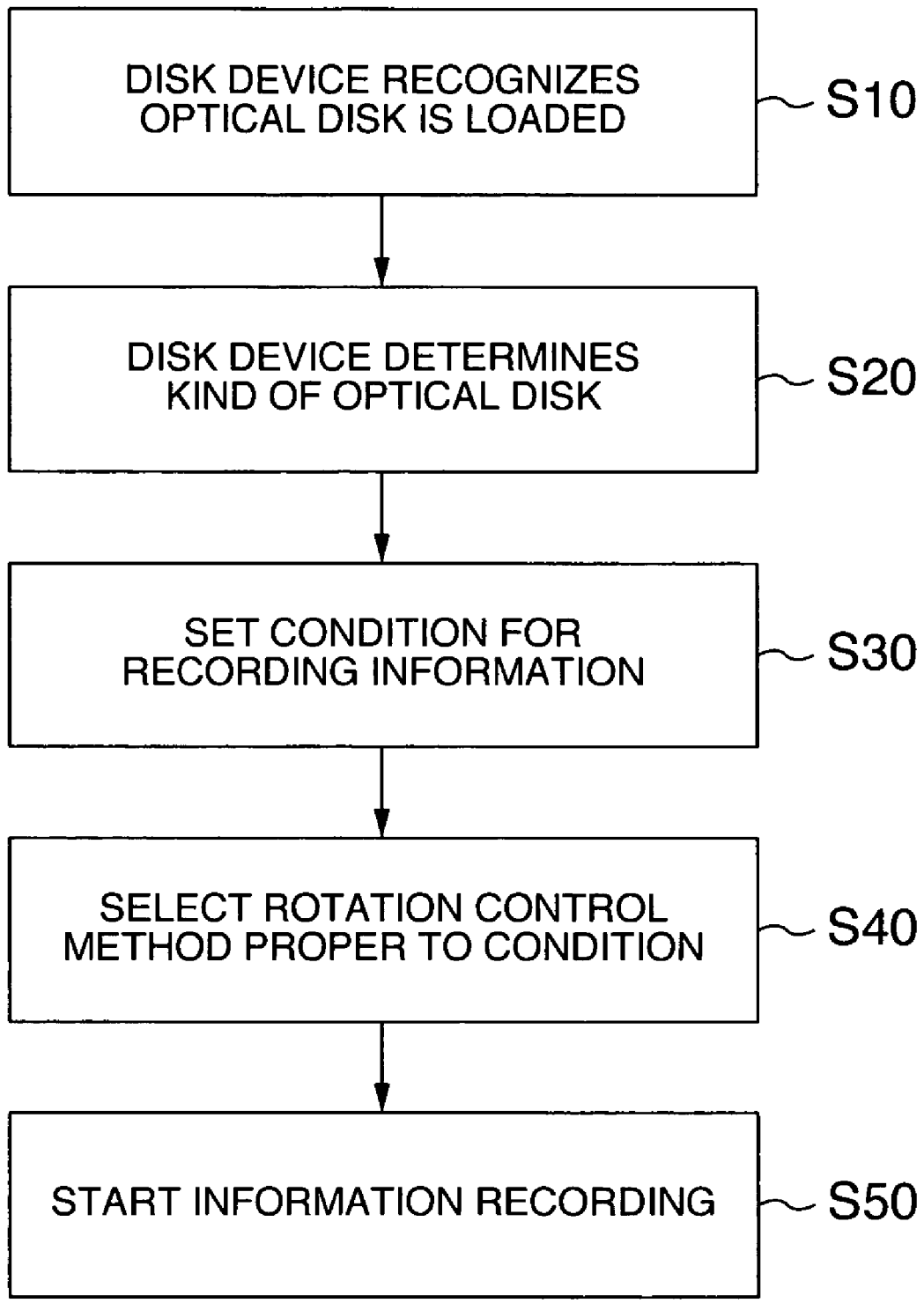

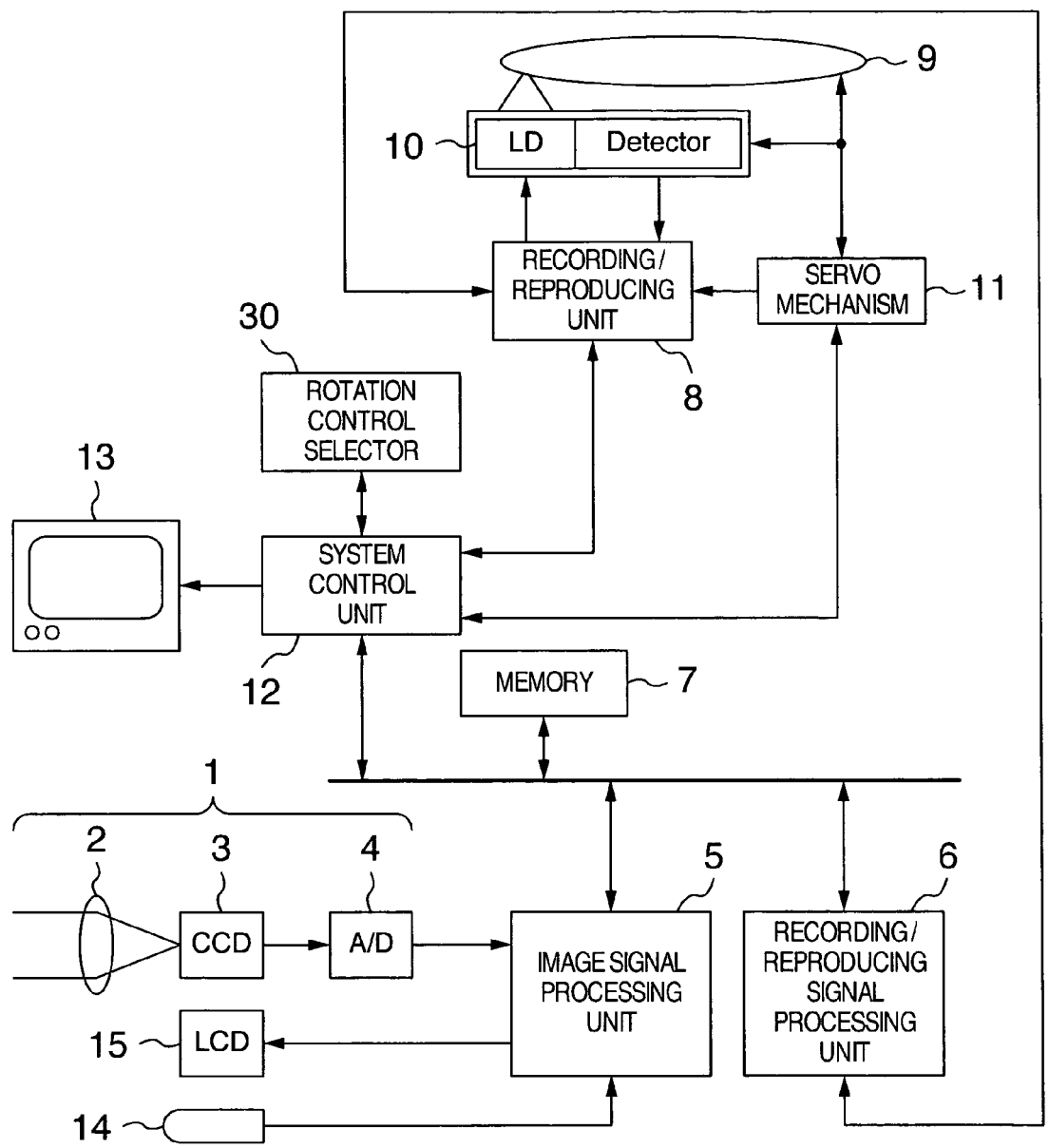

DISK DEVICE FOR RECORDING AND REPRODUCING DISKS WITH ADAPTIVE ROTATION CONTROL

INCORPORATION BY REFERENCE

The present application claims priority from Japanese application JP 2004-264800 filed on Sep. 13, 2004, the content of which is hereby incorporated by reference into this application.

BACKGROUND OF THE INVENTION

1. Field of the Invention

The present invention relates to a disk device for recording or reproducing data on or from a disk-like recording medium like an optical disk and a control method for the disk drive. In particular, the present invention relates to the disk device which is suitable to be loaded in an information recording apparatus arranged to select a recording method according to each of recording formats and record information (often referred to as "data") like a moving picture and voice on a recording medium and the control method for the disk device.

2. Description of the Related Art

A recordable optical disk is mainly used as an archive. Hence, unlike a magnetic information recording device like a harddisk drive, as to the recordable optical disk, attention has been focused on a recording capacity rather than a speed of access to recorded information or a speed of rewriting recorded information. As such, in general, the harddisk drive is constructed to record information as keeping rotation of a magnetic disk located in the drive at a constant angular velocity (CAV), while the recordable optical disk is constructed to record information as keeping the linear velocity on the disk circumference constant (that is, keeping the constant linear velocity (CLV) of the disk) for the purpose of enhancing the recording capacity of each disk.

In general, the recordable optical disk includes tracks spirally formed from the inner periphery to the outer periphery of the disk. When information is recorded on the recordable optical disk, marks are formed along the tracks through the effect of heat, for example. By making the length of one information recording unit provided when information is recorded on a track on the inner periphery of the optical disk equal to the length thereof provided when information is recorded on a track on the outer periphery of the optical disk (keeping the constant recording line density in both cases) in the track direction, it is possible to obtain more recording capacity of information to be recorded on one optical disk as compared with the recording format used in the magnetic disk located in the harddisk drive. The recording format used in the magnetic disk of the harddisk drive has as one information recording unit an arc length provided when an angle to an arc becomes constant. The length of one information recording unit is made variable according to the radial location of the disk. That is, the recording density is made lower toward the outer periphery.

Recently, a rewritable and recordable optical disk is generally a phase-change optical disk if the disk has a large capacity. This optical disk is constructed by forming amorphous marks on a crystalline area served as a recording layer of the optical disk through the use of heat of the condensed, or focused laser beam and then obtaining information as the corresponding signal through a difference of reflectivity between the amorphous portion and the crystalline portion. Since the marks are formed by heat, it is necessary to radiate the laser in consideration of heat conduction and diffraction on the disk. For recording a mark of a desired length on the disk, it is necessary to control a luminous intensity or a pulse luminous interval of the laser beam. (Hereafter, this kind of control about laser is called write strategy.) Hence, when information is recorded on the optical disk in such a recording format as keeping respective information recording units the same as each other independently of the radial location, by controlling rotation of the optical disk at the CLV, it is principally possible to use the same write strategy independently of the radial location. Hereafter, the operation of recording information as controlling rotation of the optical disk at the CLV in such a recording format as keeping the recording line density constant is called CLV recording.

For the CLV recording, the angular velocity of the optical disk is varied depending upon where of a radial location on the optical disk an objective lens for condensing, or focusing a laser beam on the surface of the optical disk is located. That is, when the objective lens is located on the outer periphery of the optical disk for recording information on the outer peripheral track of the optical disk, the angular velocity of the optical disk is less than that provided when the objective lens is located on the inner periphery. Therefore, when the objective lens is greatly moved from the inner periphery to the outer periphery or vice versa, it is necessary to control rotation of the optical disk so that the angular velocity of the optical disk is made to be a proper value and then to record information on the optical disk after the angular velocity thereof becomes the proper value.

In consideration of these matters, for example, JP-A-8-22676 discloses the disk reproducing apparatus which is arranged to control rotation of an optical disk at the CLV in the normal reproduction of data or at the CAV when accessing the disk from the inner periphery to the outer periphery or vice versa, for enhancing an access speed in reproducing a reproduction-dedicated disk on which information is recorded in such a recording format as keeping a recording line density constant.

SUMMARY OF THE INVENTION

In a case that a disk device records information onto an optical disk being suitable for recording a large capacity of information, the foregoing prior art is required to record information at the CLV for securing a recording capacity. That is, the foregoing prior art is required to constantly control the rotation of an optical disk so that the linear speed may be constant when recording information depending upon where on the radial location of the optical disk the objective lens for condensing a laser beam on the surface of the optical disk is located. In general, for the commercially available optical disks such as a DVD-RAM, a DVD-R, a DVD-RW and a BD-RE, the standards of their physical structures and recording formats are defined. Hence, the disk device arranged to be loaded with plural kinds of disks is required to control rotation of an optical disk and location of an optical head for recording information on each kind of disk in the corresponding recording format.

As to a rewritable optical disk such as a DVD-RAM disk, when recording data on the optical disk or rewriting data recorded thereof, the disk device operates to grasp where on the optical disk a defect is located by referring to a management area recorded on a certain area of the optical disk and then to write data on the optical disk. Further, when finding a defect on a recordable area on the optical disk as reading data from the optical disk, recording data on the optical disk or rewriting data recorded thereon, by updating information of the management area and recording the location of the defective area, after this operation, the disk device enables to grasp the location of the new defective area and the location of the replaceable area on the optical disk. This operation is called replacement procedure and the replaceable area is called a spare area. As to a DVD-RAM disk, the spare area is secured on the inner periphery and the outer periphery of the disk.

In a case that the disk device is loaded with a DVD-RAM disk, for example and records data on the DVD-RAM disk in a DVD Video Recording format with a verify check, each time a defective area is found in recording data, the optical head is moved to the inner periphery or the outer periphery of the optical disk. Each time the head is moved, the disk device is required to change the rotation velocity of the disk in a manner to suit to the location of the optical head, that is, the radial location on the disk of the objective lens. It means that the recording operation has to be interrupted until the rotation velocity reaches the proper velocity and is kept (referred to as "the rotation is set"). Hence, it is preferable to shorten the time taken until recording of data is completed.

In addition to the replacement procedure caused by a defect, considering the characteristics of the DVD Video Recording format, when data is often rewritten on the disk, for recording a certain amount of data, the data is often required to be recorded on several scattered areas on the disk. Also in this case, the optical head is often moved radially on the disk. Therefore, in the case of recording data on the DVD-RAM disk in the DVD Video Recording format with a verify check or in the case of the functionally analogous recording, it is preferable to shorten the time taken in completing the recording when recording data at the CLV. The term "verify check" means the operation of reproducing data after recording the data, monitoring an error ratio of the reproduced data, and rewriting the data if the error ratio is more than a predetermined ratio, for the purpose of keeping the quality of the recording characteristics more than a certain quality level.

On the other hand, in a case that the disk device is loaded with a DVD-R disk or a DVD-RW disk, for example and records data in a DVD Video format at a stream mode, no verify check is required and the data is recorded from a start location in a single stroke, from the inner periphery to the outer periphery. Hence, as the location of the optical head, that is, the radial location on the disk of the objective lens is moved from the inner periphery to the outer periphery, the angular velocity of the optical disk is made gradually variable as keeping the linear velocity constant. It means that the operation of setting the rotation of the optical disk does not take any time.

As set forth above, the disk device is arranged not only to be loaded with plural kinds of optical disks but also to select a proper recording format for one kind of disk and a recording method according to the kind of data to be recorded. However, if the disk device is arranged to process plural kinds of optical disks and use plural recording formats, it is preferable to shorten the time taken until recording of a certain amount of data is completed without selecting and changing the kind and the method of the rotation control in recording the data. Even the system disclosed in JP-A-8-22676 does not suppose the information recording that requires more strict laser intensity control or rotation control. Further, the JP-A-8-22676 discloses only the operation of accessing data on a disk from the inner periphery to the outer periphery or vice versa. Hence, the disk device arranged to treat plural kinds of optical disks and use plural recording formats needs a considerably long time until recording of a certain amount of data is completed.

It is an object of the present invention to provide a disk device that is arranged to treat plural kinds of optical disks and to use plural recording formats and enables to rapidly complete recording of a certain amount of information by selecting the proper rotation control method to the optical disk or the recording format.

In carrying out the foregoing object, the disk device according to the present invention provides means for selecting and changing a kind and a method of controlling rotation of an optical disk based on the recording format and the recording method to be selected in light of the kind of an optical disk loaded in the disk device and information to be recorded and operates to record information as shortening the time taken in setting the rotation of an optical disk. Even for the same kind of optical disk, the disk device enables to record information by selecting the kind and the method of rotation control so that the time taken in setting the rotation may be shortened.

According to the present invention, by selecting the rotation control method such as the CAV or the CLV depending upon the kind of an optical disk loaded in the disk device as well as the recording format and the recording method for recording information on the optical disk or any combination of them, the disk device enables to more efficiently and rapidly record a certain amount of information on the optical disk.

BRIEF DESCRIPTION OF THE DRAWINGS

FIG. 2 is a flowchart showing a flow of recording to be executed in the disk device according to the present invention.

FIG. 3 is a block diagram showing a system arrangement of an overall disk device according to the present invention.

DESCRIPTION OF THE EMBODIMENTS

Figure 1:
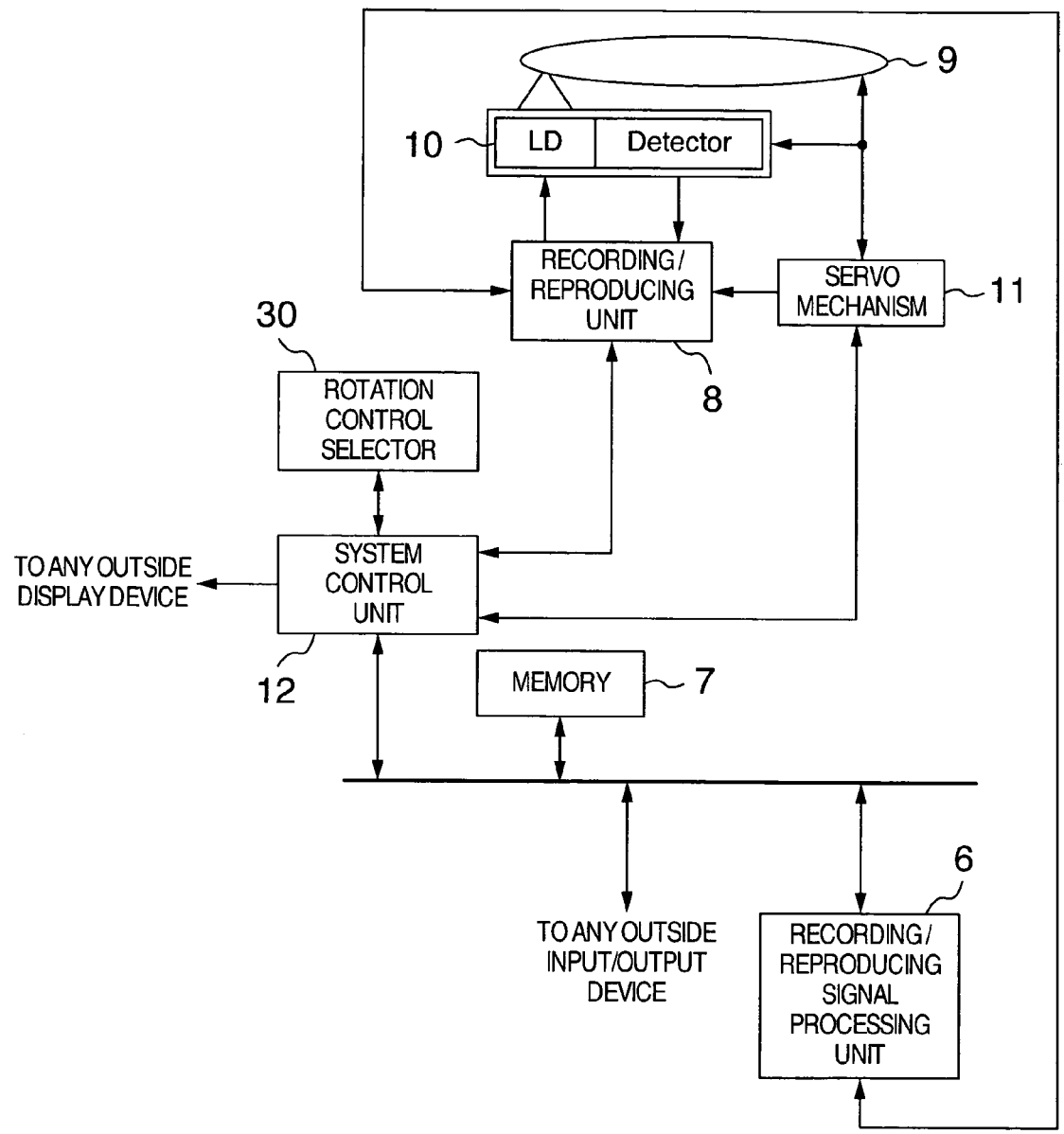
FIG. 1 is a block diagram showing an arrangement of a disk device system according to a first embodiment of the present invention.

The embodiment of the present invention will be described with reference to FIGS. 1 and 2. FIG. 3 is a block diagram showing a schematic arrangement of an overall device to which a disk drive of the present invention is applied.

In FIG. 3, a numeral 1 denotes an imaging unit, which is composed of an imaging optical system 2, a charge-coupled device (CCD) 3 and an A/D converter 4. A subject is imaged on the CCD 3 through the imaging optical system 2. The CCD 3 outputs the corresponding image signal with the imaged subject to the A/D converter 4, which digitizes the image signal and then outputs to an image signal processing unit 5. The image signal processing unit 5 operates to convert the image signal sent from the imaging unit 1 into the corresponding image data. This image signal processing unit 5 also has a role of processing a voice signal sent from a microphone 14 served as a voice signal input device.

When reproducing the image data, the image signal processing unit 5 operates to convert the image data sent from a recording and reproducing signal processing unit 6 (to be discussed later) into an image signal dedicated for displaying the corresponding image. Further, this image signal processing unit 5 also has a role of converting voice data sent from the processing unit 6 into the corresponding voice signal dedicated for outputting the voice information.

As to a video camera, the image data and the voice data are serially processed by the image signal processing unit 5. The image quality and the voice quality are determined on the processing performance of the image signal processing unit 5.

The processing performance determines a transfer speed of data to be sent from the image signal processing unit 5 to the recording and reproducing signal processing unit 6.

A numeral 6 denotes the recording and reproducing signal processing unit as described above. This processing unit 6 performs an encode/decode process, a modulation/demodulation process, an ECC (Error Correcting Codes) addition/error correcting process, and so forth, for the purpose of converting the image data (containing the voice data) sent from the image signal processing unit 5 into the recording data according to a recording format in which the data is to be recorded on a disk-like recording medium 9 or converting the recording data reproduced from the disk-like recording medium 9 into the image data (containing voice data). The transfer speed at which the data is recorded onto the disk or reproduced from the disk is determined by the processing performance of the recording and reproducing signal processing unit 6, the processing performance of a recording and reproducing unit 8, a rotation speed of the disk, and so forth. A numeral 7 denotes a memory for temporarily storing the image data (containing voice data) sent from the image signal processing unit 5.

The memory 7 stores data if the transfer speed of the image data or the voice data to be transferred from the image signal processing unit 5 into the recording and reproducing signal processing unit 6 is faster than the speed at which the image data or the voice data is to be recorded onto the disk-like recording medium 9. Hence, the recording of the data on the disk-like recording medium 9 has to be completed before the amount of the data stored in the memory 7 reaches the memory capacity.

A numeral 8 denotes a recording and reproducing unit. A numeral 9 denotes a disk-like recording medium (optical disk) to be rotated by a spindle motor (not shown). A numeral 10 denotes an optical head composed of a laser beam source (laser diode), an optical system, a light detector, and so forth. The recording and reproducing unit 8 operates to record the recording data stored in the memory 7 onto the optical disk 9 through the effect of the optical head 10. Further, the recording and reproducing unit 8 operates to temporarily store the recording data reproduced from the optical disk 9 in the memory 7 through the effect of the optical head 10. A numeral 11 denotes a servo mechanism, which performs a servo control required for optical recording, such as a focus control and a tracking control for controlling an actuator (not shown) of the optical head 10, a rotation control of a disk for controlling a spindle motor (not shown), a seek control for controlling an address location.

A numeral 15 denotes an image display device composed of a liquid crystal display (LCD). The data passes through the following route until it is displayed on the image display device. When reproducing data, the data recorded on the optical disk 9 is read through the optical head 10. (Concretely, the data is derived by focusing a laser beam onto the optical disk and reading the light reflected from the optical disk as a difference of reflected light quantity through the optical detector.) The data passes the recording and reproducing unit 8 and then is put into the memory 7 in which the data is temporarily stored as the reproduced recording data. Then, the recording data is converted into the original image data through the recording and reproducing signal processing unit 6. The converted image data is processed in the image signal processing unit 5 and then is displayed on the image display device 15.

A numeral 12 denotes a system control unit composed of a control microcomputer for administering the general control of the overall device and the relevant application programs. This system control unit 12 controls the parts of the foregoing units and the general management of the overall device.

In turn, the description will be turned to the disk device according to the present invention. This disk device is arranged to carry out the foregoing objects. FIG. 1 is a block diagram showing a schematic arrangement of one embodiment to which the disk drive is applied. In FIG. 1, the components having the same numerals as those shown in FIG. 3 have the same functions. A numeral 30 denotes a rotation control selector, which operates to select a rotation control method such as the CAV or the CLV according to not only the kind of an optical disk loaded in the disk device but also the recording format or the recording method in which information is to be recorded on an optical disk, or their combination.

In FIG. 1, the rotation control selector 30 is illustrated apart from a system control unit 12. It is a mere example. The rotation control selector 30 may be included as one component in the system control unit 12. The location of the rotation control selector 30 in the block diagram is not limited to that shown in FIG. 1. Instead, the selector 30 may be located between the system control unit 12 and the servo control unit 11. That is, what is required is that the system control unit 12 having the application programs can transfer information about the selected rotation control method with the servo control unit 11 for executing various controls like the rotation control. In addition, the imaging unit, the LCD, the microphone and the image signal processing unit shown in FIG. 3 are not illustrated in FIG. 1. In actual, however, the arrangement shown in FIG. 1 may have the similar components, though not shown in FIG. 1.

In turn, the description will be turned to an example of a process of selecting the rotation control method according to a kind of an optical disk, a recording format, a recording method or their combinations. FIG. 2 roughly illustrates an example of a series of processes to be executed from when an optical disk is loaded in the present disk device or when the disk device where an optical disk is loaded is turned on to when information is actually recorded on the optical disk.

In a step S10, the disk device recognizes that an optical disk is loaded in itself. Then, in a step S20, the disk device determines what kind of optical disk is loaded in itself. If it is a recordable optical disk, the disk device further determines the kind of the optical disk, that is, if the optical disk is a write-once disk such as a DVD-R or BD-R or a rewritable disk such as a DVD-RAM or a DVD-RW.

After the kind of the disk is determined, in a step S30, the disk device selects the recording format that is suitable to the disk kind or is defined on the standards. Further, the disk device determines whether or not a verify check or a replacement procedure is to be added through the system control unit 12. The rotation control selector 30 selects the rotation control method by which a certain amount of information may be recorded efficiently and rapidly from a viewpoint of time in light of the kind of the optical disk, the recording format or the recording method. The concrete selection will be discussed below. Based on the determined conditions, in a step S50, recording of information is started.

The process of selecting the most appropriate rotation control method to be executed by the rotation control selector 30 will be executed as follows.

In a case that the optical disk loaded in the present disk device is a DVD-RAM disk, it is regulated according to the specifications defined by DVD Forum that the recording format in which information is to be recorded on the disk is the DVD Video Recording Format. Further, in a case that the optical disk loaded in the present disk device is a DVD-RW disk, it is also regulated that the recording format in which information is to be recorded on the disk is the DVD Video Recording Format or the DVD Video Format.

If the system control unit 12 recognizes that the information to be recorded on the disk needs to be highly reliable, for example, the information is a file to be treated by a personal computer, the system control unit 12 requests to execute the verify check or the replacement procedure. Since the information recording is based on the DVD Video Recording Format that needs the verify check and the replacement procedure, each time a defective area is found while recording information, the optical head is moved to the inner periphery or the outer periphery of the disk, or the rewrite of information on the disk frequently takes place, so that a certain amount of information is required to be recorded on several scattered areas on the disk. Those mean that the optical head often changes the radial location on the disk.

As such, the rotation control selector 30 selects the rotation control method, in which method information is recorded in the recording format for keeping a constant recording line density as controlling the rotation of the optical disk at the CAV so that no waiting time takes place until the rotation is set. Since the angular velocity is kept constant, no waiting time takes place until the rotation is set. Since the linear velocity is made variable according to the radial location, the most appropriate recording power is adjusted according to the location on the disk. This is because the recording of information on a phase changing medium such as the DVD-RAM disk or the DVD-RW disk is executed through the effect of heat caused by a laser beam.

If the system control unit 12 recognizes that the information to be recorded on the DVD-RAM disk or the DVD-RW disk is recording data for which a recording operation is required to be streamingly performed without interruption as much as possible, rather than the operation is performed with high quality of the picture, such as moving picture information recorded by a DVD camcorder, the system control unit 12 does not request to execute the verify check or the replacement procedure.

This kind of data is recorded along the tracks in one stroke, that is, from the start location to the inner periphery to the outer periphery without any verify check or replacement procedure. Hence, as the location of the optical head, that is, the radial location of the objective lens on the disk is moved from the inner periphery to the outer periphery, the angular velocity of the optical disk is made gradually variable as keeping the linear velocity constant. It means that no time is taken in setting the rotation of the optical disk. As such, the rotation control selector 30 selects the rotation control method in which the information is recorded in the recording format for keeping a constant recording line density as controlling the rotation of the optical disk at the CLV.

In a case that the optical disk loaded in the present disk device is a DVD-R disk, it is regulated that the DVD Video Format is used for recording information on the disk. Since the DVD-R disk is a write-once recordable disk, if the system control unit 12 recognizes that the streaming recording is required for the information, the system control unit 12 does not request to execute the verify check or the replacement procedure. The information is recorded on the disk along tracks in one stroke from the start location to the inner periphery to the outer periphery without any verify check or replacement procedure.

Hence, as the location of the optical head, that is, the radial location of the objective lens on the disk is moved from the inner periphery to the outer periphery, the angular velocity of the optical disk is made gradually variable so that the linear velocity may be kept constant. It means that no time is taken in setting the rotation of the optical disk. As such, the rotation control selector 30 selects the rotation control method in which information is recorded in the recording format for keeping a constant recording line density as controlling the rotation of the optical disk at the CLV.

In the foregoing description, the optical disk loaded in the present disk device is a DVD-RAM disk, a DVD-RW disk or a DVD-R disk. The optical disks to be loaded in the disk device are not limited to those disks. Any recordable optical disk may be used. It is possible to select the recording format proper to the optical disk loaded therein or regulated therefor. And, based on whether or not the verify check or the replacement procedure is to be executed, the rotation control selector 30 may select the rotation control method for recording information on the disk.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A disk device comprising:
   a recording and reproducing device which optically records information including image and voice on a disk-like recording medium, or reproduces information from said disk-like recording medium; and
   a rotation controller which selects a method of rotating said disk-like recording medium based on factors comprising at least (1) a type of said disc-like recording medium, and (2) a recording format with which said information is recorded on said disk-like recording medium;
   wherein, when said disk-like recording medium is of a first type selected from a group comprising DVD-R and BD-R, the rotation controller controls to keep a linear velocity constant with DVD Video Format; and
   wherein, when the disk-like recording medium is of a second type selected from a group comprising DVD-RW, the controller controls to keep (1) a linear velocity constant accompanying a replacement procedure if the information is recorded with DVD Video Format, and (2) an angular velocity constant without a replacement procedure if the information is recorded with DVD Video Recording Format.

2. A disk device according to claim 1,
   wherein, if the disk-like recording medium is of a third type selected from a group comprising DVD-RAM, a controller controls a recorder to record with DVD Video Recording Format.

3. A disk device comprising:
   a recording device which optically records plural kinds of information on a disk-like recording medium while rotating the recording medium; and
   a rotation selector which selects a method of rotating the disk-like recording medium according to factors comprising at least (1) a recording format and (2) a material of the disc-like recording medium;
   wherein, if the disk-like recording medium is of first type selected from a group comprising DVD-R and BD-R, the rotation selector keeps a linear velocity constant with DVD Video Format; and
   wherein, if the disk-like recording medium is of the second type selected from a group comprising DVD-RW, the rotation selector keeps (1) a linear velocity constant accompanying a replacement procedure if the information is recorded with DVD Video Format, and (2) an angular velocity constant without a replacement procedure if the information is recorded with DVD Video Recording Format.

4. A disk device according to claim 3,
wherein, if the disk-like recording medium is of a third type selected from a group comprising DVD-RAM, a controller controls a recorder to record with DVD Video Recording Format.

5. An information recording apparatus comprising:

an information input device which is supplied with plural kinds of information, each of which includes a recording format having been defined in advance;

a recorder which records onto a disk-like recording medium the information supplied into the information input device, while rotating the disk-like recording medium;

a discriminating device which discriminates the recording format of the information supplied to the information input device, and to be recorded onto the disk-like recording medium; and a controller which controls the recorder in a manner to change a recording operation of the recorder on the basis of the recording format discriminated by the discriminating device;

wherein, if the disk-like recording medium is of a first type selected from a group comprising DVD-R and BD-R, the controller controls the recorder to record with DVD Video Format; and wherein, if the disk-like recording medium is of a second type selected from a group comprising DVD-RW, the controller controls the recorder to record with (1) a constant linear velocity constant accompanying a replacement procedure if the information is recorded with DVD Video Format, and (2) a constant angular velocity without a replacement procedure if the information is recorded with DVD Video Recording Format.

6. An information recording apparatus according to claim 5, wherein, if the disk-like recording medium is of a third type selected from a group comprising DVD-RAM, a controller controls a recorder to record with DVD Video Recording Format.

7. An information recording method comprising the steps of:

detecting a kind of a disk-like rotating recording medium;

setting an information recording format according to said detected kind of medium, depending on whether the disk-like recording medium is of a first type selected from a group comprising DVD-R and BD-R, or is of a second type selected from a group comprising DVD-RAM and DVD-RW;

selecting a rotation control method corresponding with said information recording format; and recording information on said disk-like rotating recording medium;

wherein, said recording medium is rotated according to said selected rotation control method;

wherein, if the disk-like recording medium is of a first type selected from a group comprising DVD-R and BD-R, a controller controls a recorder to record with DVD Video Format; and wherein, if the disk-like recording medium is of a second type selected from a group comprising DVD-RW, the controller controls the recorder to record with (1) a constant linear velocity constant accompanying a replacement procedure if the information is recorded with DVD Video Format, and (2) a constant angular velocity without a replacement procedure if the information is recorded with DVD Video Recording Format.

8. An information recording method according to claim 7, wherein, if the disk-like recording medium is of a third type selected from a group comprising DVD-RAM, a controller controls a recorder to record with DVD Video Recording Format.

\* \* \* \* \*

UNITED STATES PATENT AND TRADEMARK OFFICE
CERTIFICATE OF CORRECTION

PATENT NO.        : 7,663,993 B2
APPLICATION NO. : 11/220590
DATED             : February 16, 2010
INVENTOR(S)       : Osamu Komoda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 878 days.

Signed and Sealed this

Twenty-eighth Day of December, 2010

David J. Kappos
*Director of the United States Patent and Trademark Office*